United States Patent
Kawai (10) Patent No.: US 8,896,895 B2
(45) Date of Patent: Nov. 25, 2014

(54) IMAGE READING APPARATUS AND IMAGE FORMING APPARATUS

(71) Applicant: KYOCERA Document Solutions Inc., Osaka (JP)

(72) Inventor: Hisaji Kawai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/221,107

(22) Filed: Mar. 20, 2014

(65) Prior Publication Data
US 2014/0293364 A1    Oct. 2, 2014

(30) Foreign Application Priority Data

Mar. 26, 2013  (JP) ................. 2013-064350

(51) Int. Cl.
 H04N 1/46  (2006.01)
 H04N 1/00  (2006.01)
(52) U.S. Cl.
 CPC ....... H04N 1/00819 (2013.01); H04N 1/00814 (2013.01)
 USPC ............ 358/509; 358/505; 358/406
(58) Field of Classification Search
 None
 See application file for complete search history.

(56) References Cited

U.S. PATENT DOCUMENTS

| | | | | |
|---|---|---|---|---|
| 8,368,974 B2* | 2/2013 | Nagasaka | | 358/487 |
| 2007/0188584 A1* | 8/2007 | Nakamura et al. | | 347/133 |
| 2009/0289965 A1* | 11/2009 | Kurokawa et al. | | 345/690 |
| 2011/0062874 A1* | 3/2011 | Knapp | | 315/158 |
| 2011/0068699 A1* | 3/2011 | Knapp | | 315/158 |
| 2011/0147566 A1* | 6/2011 | Furuya et al. | | 250/205 |
| 2011/0221931 A1* | 9/2011 | Wakabayashi et al. | | 348/229.1 |
| 2012/0188328 A1* | 7/2012 | Takezawa | | 347/247 |
| 2012/0301159 A1* | 11/2012 | Takahashi | | 399/27 |
| 2014/0035472 A1* | 2/2014 | Raj et al. | | 315/185 R |
| 2014/0285536 A1* | 9/2014 | Haruna et al. | | 345/690 |

FOREIGN PATENT DOCUMENTS

JP   11-3007 A   1/1999

* cited by examiner

Primary Examiner — Madelein A Nguyen
(74) Attorney, Agent, or Firm — Stein IP, LLC (57) ABSTRACT

An image reading apparatus includes: a light amount adjustment portion which performs light amount adjustment on a light source such that the maximum value of the analog output of an image sensor does not exceed the upper limit value of an input voltage range of an A/D conversion portion but approaches the upper limit value; a temperature sensor which measures a temperature; and a storage portion which stores a temperature at the time of the light amount adjustment. When an absolute value of a temperature difference between a temperature stored in the storage portion and the current temperature is less than a threshold value, the light amount adjustment portion does not perform the light amount adjustment whereas when the absolute value is equal to or more than the threshold value, the light amount adjustment portion performs the light amount adjustment.

8 Claims, 5 Drawing Sheets

IMAGE READING APPARATUS AND IMAGE FORMING APPARATUS

CROSS-REFERENCE TO RELATED APPLICATIONS

This application claims the benefit of Japanese Application No. 2013-064350, filed Mar. 26, 2013, in the Japanese Patent Office. All disclosures of the document(s) named above are incorporated herein by reference.

BACKGROUND OF THE INVENTION

The present disclosure relates to an image reading apparatus and an image forming apparatus.

Conventionally, an image reading apparatus that reads an original document to generate image data is known, and for example, the image reading apparatus is fitted to an image forming apparatus such as a copying machine. The image reading apparatus described above includes, for example, a light source, an image sensor and an A/D conversion portion.

The light source generates light that is applied to the original document of a target to be read. The image sensor receives light reflected off the original document, and outputs an analog signal corresponding to the amount of the reflected light that has been received. The A/D conversion portion converts the analog output of the image sensor from analog to digital to output digital image data.

Here, for example, when the analog output of the image sensor exceeds the upper limit value of the input voltage range (convertible range) of the A/D conversion portion, even if the analog output of the image sensor is varied such that the analog output of the image sensor is increased, a digital value after the A/D conversion is not varied, and all the analog output is converted into the maximum digital value. When as described above, the output of the A/D conversion portion is saturated, for example, if a bright image is included in the original document of the target to be read, all the bright image is read as white, with the result that a phenomenon called white skipping occurs (the image quality is degraded).

Hence, normally, light amount adjustment on the light source is performed so that the maximum value of the analog output of the image sensor (for example, the analog output of the image sensor reading a white reference plate for shading correction) is prevented from excessing the upper limit value of the input voltage range of the A/D conversion portion.

Conventionally, when power is input to the image reading apparatus, as an initial adjustment, not only a light amount adjustment but also a gain adjustment, an offset adjustment and the like are performed. Thus, since after the input of power to the image reading apparatus, with various setting values such as a light amount setting value set at the optimum values, it is possible to perform a job, the degradation of the image quality is reduced. However, when the initial adjustment including the light amount adjustment is performed, a waiting time since the input of power to the image reading apparatus until it is possible to perform the execution of the job is made long Hence, this is inconvenient for a user.

SUMMARY OF THE INVENTION

In the present disclosure, an image reading apparatus and an image forming apparatus are provided that can reduce a time necessary for an initial adjustment without degrading image quality.

According to one aspect of the present disclosure, an image reading apparatus includes a light source, an image sensor, an analog processing portion, an A/D conversion portion, a light amount adjustment portion, a temperature sensor and a storage portion. The light source applies light to a target to be read. The image sensor receives light reflected off the target to be read to read the target to be read. The analog processing portion performs analog processing on an analog output of the image sensor. The A/D conversion portion converts the analog output of the image sensor processed by the analog processing portion into digital image data. The light amount adjustment portion performs light amount adjustment on the light source such that a maximum value of the analog output of the image sensor processed by the analog processing portion does not exceed an upper limit value of an input voltage range of the A/D conversion portion but approaches the upper limit value. The temperature sensor measures a temperature around the image reading apparatus. The storage portion stores temperature data indicating the temperature around the image reading apparatus at a time of the light amount adjustment. When an absolute value of a temperature difference between a temperature stored in the storage portion and a current temperature is less than a predetermined threshold value, the light amount adjustment portion does not perform the light amount adjustment whereas when the absolute value of the temperature difference between the temperature stored in the storage portion and the current temperature is equal to or more than the threshold value, the light amount adjustment portion performs the light amount adjustment.

An image forming apparatus according to another aspect of the present disclosure includes the image reading apparatus described above.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

An image forming apparatus including an image reading apparatus will be described below using, as an example, a multifunctional peripheral that can perform a plurality of jobs.

(Overall Configuration of the Image Forming Apparatus)

Figure 1:
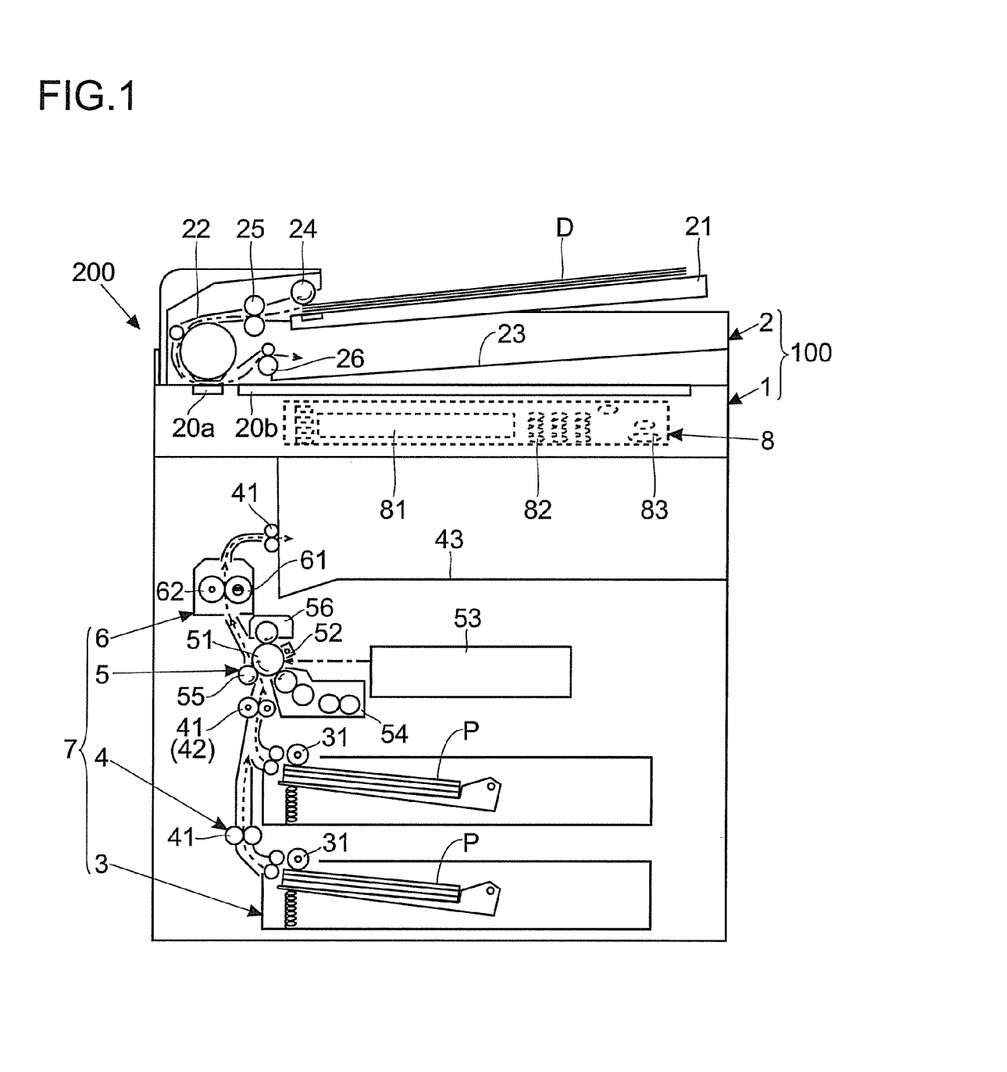
FIG. 1 is a schematic diagram showing an image forming apparatus including an image reading apparatus according to an embodiment of the present disclosure.

As shown in FIG. 1, the image reading apparatus 100 is arranged above the main body of the image forming apparatus 200. The image reading apparatus 100 reads an original document D that is a target to be read, and thereby generates image data.

The image forming apparatus 200 includes an engine portion 7 that is formed with a paper feed portion 3, a sheet transport portion 4, an image formation portion 5 and a fixing portion 6. Based on image data (such as the image data obtained by reading the original document D with the image reading apparatus 100), the engine portion 7 prints an image on a sheet P and outputs it.

The paper feed portion 3 holds the sheets P and feeds the sheets P that are held to the sheet transport portion 4. Hence, in the paper feed portion 3, a pickup roller 31 is provided that the sheets P held are removed one by one and are fed to the sheet transport portion 4. The sheet transport portion 4 transports the sheet P fed from the paper feed portion 3 through the image formation portion 5 and the fixing portion 6 in this order. The transport of the sheet P with the sheet transport portion 4 is performed by a plurality of transport roller pairs 41. One of the transport roller pairs 41 is a resist roller pair 42. The resist roller pair 42 places the sheet P on standby in front of the image formation portion 5, and feeds it to the image formation portion 5 with appropriate timing. The sheet P that is transported by the sheet transport portion 4 is finally guided to an ejection tray 43.

The image formation portion 5 forms a toner image based on the image data, and transfers the toner image to the sheet P. The image formation portion 5 includes a photosensitive drum 51, a charging device 52, an exposure device 53, a development device 54, a transfer roller 55 and a cleaning device 56.

At the time of image formation, the photosensitive drum 51 is rotated to be driven, and the surface of the photosensitive drum 51 is charged to a predetermined potential by the charging device 52. The exposure device 53 includes a light emission element (not shown) that emits light for exposure, and scans and exposes the surface of the photosensitive drum 51 while turning on and off the light emission element on the image data. Thus, an electrostatic latent image is formed on the surface of the photosensitive drum 51. The development device 54 supplies toner to the electrostatic latent image formed on the surface of the photosensitive drum 51, and develops it.

The transfer roller 55 is pressed onto the surface of the photosensitive drum 51. In its state, the resist roller pair 42 makes the sheet P enter between the transfer roller 55 and the photosensitive drum 51 with appropriate timing. Here, a transfer voltage is applied to the transfer roller 55. Thus, the toner image on the surface of the photosensitive drum 51 is transferred to the sheet P. After the completion of the transfer of the toner image to the sheet P, the cleaning device 56 removes the toner and the like left on the surface of the photosensitive drum 51.

The fixing portion 6 fixes the toner image transferred to the sheet P by heating and pressurizing it. The fixing portion 6 includes a fixing roller 61 that incorporates a heat source and a pressurization roller 62 that is pressed onto the fixing roller 61. Then, the sheet P to which the toner image has been transferred is passed between the fixing roller 61 and the pressurization roller 62, and is thereby heated and pressurized. Thus, the toner image is fixed to the sheet P, and the printing is completed. The sheet P on which the printing has been completed is fed by the transport roller pair 41 to the ejection tray 43.

The image forming apparatus 200 includes an operation panel 8. The operation panel 8 is arranged on the front surface side of the image forming apparatus 200 (the image reading apparatus 100), and includes a liquid crystal display portion 81 whose display surface is covered by a touch panel. The liquid crystal display portion 81 displays setting keys (soft keys) for receiving various types of settings and the like and a message. Furthermore, in the operation panel 8, hard keys such as a numerical keypad 82 for receiving a numerical input and a start key 83 for receiving an instruction to perform a job are also provided.

(Configuration of the Image Reading Apparatus)

Figure 2:
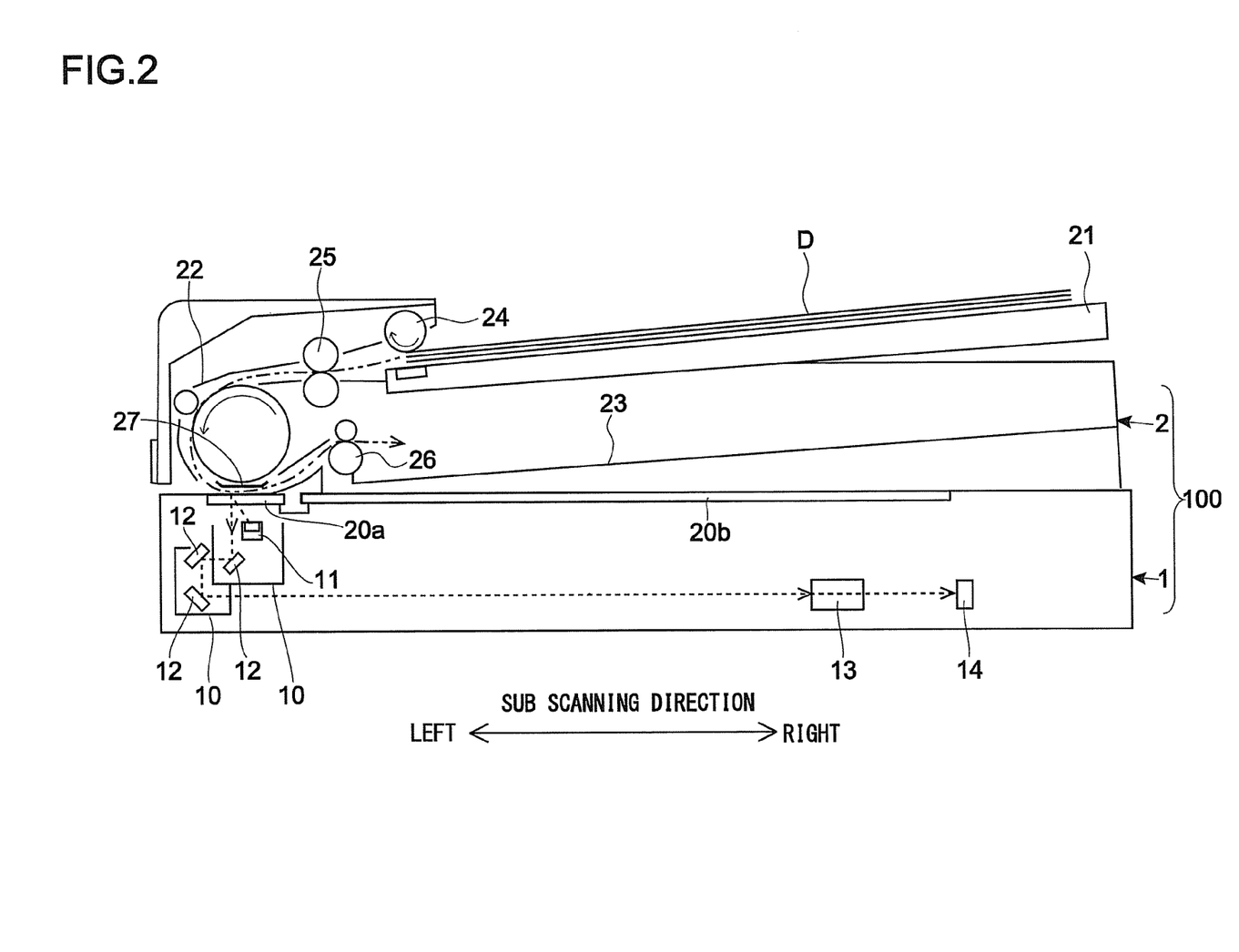
FIG. 2 is a detailed diagram of the image reading apparatus shown in FIG. 1.

As shown in FIG. 2, the image reading apparatus 100 includes an image reading portion 1 and an original document transport portion 2. The image reading portion 1 reads the original document D to generate the image data. The original document transport portion 2 is attached to the image reading portion 1. For example, the original document transport portion 2 transports the original document D to the image reading portion 1, and presses the original document D to be read by the image reading portion 1.

The original document transport portion 2 removes the original document D set in an original document set tray 21, and ejects it through an original document transport passage 22 to an original document ejection tray 23. When a plurality of sheets of original documents D are set in the original document set tray 2, the original document transport portion 2 continuously removes the sheets of the original documents D one by one.

In the original document transport passage 22, sequentially from the upstream side in the original document transport direction, an original document feed roller 24, an original document transport roller pair 25 and an original document ejection roller pair 26 are provided. The original document D set in the original document set tray 21 is removed by the original document feed roller 24, and is transported by the original document transport roller pair 25. Thereafter, the original document D is ejected by the original document ejection roller pair 26 into the original document ejection tray 23. The original document feed roller 24, the original document transport roller pair 25 and the original document ejection roller pair 26 are coupled to a transport motor M2 (see FIG. 4). The original document feed roller 24, the original document transport roller pair 25 and the original document ejection roller pair 26 are rotated by transmission of the drive force of the transport motor M2.

The image reading portion 1 has a box-shaped enclosure. At one end portion of the upper surface of the enclosure, a transport reading contact glass 20a is arranged, and in the center portion of the upper surface of the enclosure, a placement reading contact glass 20b is arranged. Within the enclosure, an LED lamp 11, a mirror 12, a lens 13, an image sensor 14 and the like are provided. The LED lamp 11 corresponds to a "light source" of the present disclosure.

The LED lamp 11 includes a plurality of LED elements that generate light to be applied to the original document D. Although not shown in the figure, the LED elements are linearly aligned in a main scanning direction (direction perpendicular to the plane of FIG. 2) that is a reading line direction. Instead of the LED lamp 11, a cold-cathode tube or the like may be used.

When the original document D transported to the transport reading contact glass 20a is read, the LED lamp 11 applies light to the transport reading contact glass 20a (the light passing through the transport reading contact glass 20a is applied to the original document D). On the other hand, when the original document D placed on the placement reading contact glass 20b is read, the LED lamp 11 applies light to the placement reading contact glass 20b (the light passing through the placement reading contact glass 20b is applied to the original document D). The light reflected off the original document D is reflected off the mirror 12, and is guided to the lens 13. The lens 13 collects the reflected light.

The image sensor 14 receives the light reflected off the original document D (the light collected by the lens 13) to read the original document D per line. The image sensor 14 is formed with a CCD that includes a plurality of photoelectric conversion elements linearly aligned in the main scanning direction, and performs, when receiving the reflected light, photoelectric conversion per line per pixel and accumulates it. Then, the image sensor 14 outputs an analog signal corresponding to the accumulated charge. In other words, the analog output of the image sensor 14 per pixel is varied according to the amount of the reflected light.

The LED lamp 11 and the mirror 12 are supported by a movement frame 10 that can be moved in a sub scanning direction perpendicular to the main scanning direction. In other words, the LED lamp 11 and the mirror 12 are moved, by the movement of the movement frame 10 in the sub scanning direction, in the sub scanning direction together with the movement frame 10. The movement frame 10 is coupled to a scanning motor M1 (see FIG. 4). The movement frame 10 (the LED lamp 11 and the mirror 12) are moved in the sub scanning direction by the transmission of the drive force of the scanning motor M1.

When the original document D to be transported to the transport reading contact glass 20*a* is read, the movement frame 10 is moved below the transport reading contact glass 20*a* and is stopped. Thereafter, the original document D is transported by the original document transport portion 2 to the transport reading contact glass 20*a*. Here, the LED lamp 11 applies light to the original document D passing through the transport reading contact glass 20*a*, and the photoelectric conversion on the light reflected off the original document D is continuously repeated by the image sensor 14. Thus, the reading of the original document D is performed per line.

On the other hand, when the original document D placed on the placement reading contact glass 20*b* is read, the movement frame 10 is moved in the sub scanning direction (direction extending from the left to the right when seen from the front surface). Then, while the movement frame 10 is being moved in the sub scanning direction, the LED lamp 11 applies light to the original document D placed on the placement reading contact glass 20*b*, and the photoelectric conversion on the light reflected off the original document D is continuously repeated by the image sensor 14. Thus, the reading of the original document D is performed per line.

The original document transport portion 2 is attached to the image reading portion 1 such that the original document transport portion 2 can be opened and closed with respect to the image reading portion 1. Specifically, a rotation shaft (not shown in the figure) is provided on the back surface side of the image reading portion 1, and the original document transport portion 2 is rotatably attached to the rotation shaft. Hence, the original document transport portion 2 is rotated, with a portion on the front surface side being a free end, such that the portion on the front surface side is vertically shaken, and thus the original document transport portion 2 enters an opening and closing position with respect to the image reading portion 1. Thus, when the original document transport portion 2 is closed, the transport reading contact glass 20*a* and the placement reading contact glass 20*b* are covered by the original document transport portion 2. Hence, when the original document D placed on the placement reading contact glass 20*b* is read, the original document D can be pressed by the original document transport portion 2.

In a predetermined portion of the original document transport portion 2 opposite the transport reading contact glass 20*a* when the original document transport portion 2 is closed, a white reference plate 27 for acquiring white reference data used for shading correction is provided. In other words, with the original document transport portion 2 closed, the white reference plate 27 is arranged opposite the transport reading contact glass 20*a*. Hence, when the original document D is not transported to the transport reading contact glass 20*a*, if the LED lamp 11 is turned on below the transport reading contact glass 20*a*, the light from the LED lamp 11 is reflected off the white reference plate 27. In other words, the white reference plate 27 is read by the image sensor 14. In this case, the white reference plate 27 is the target to be read.

(Hardware Configuration of the Image Forming Apparatus)

Figure 3:
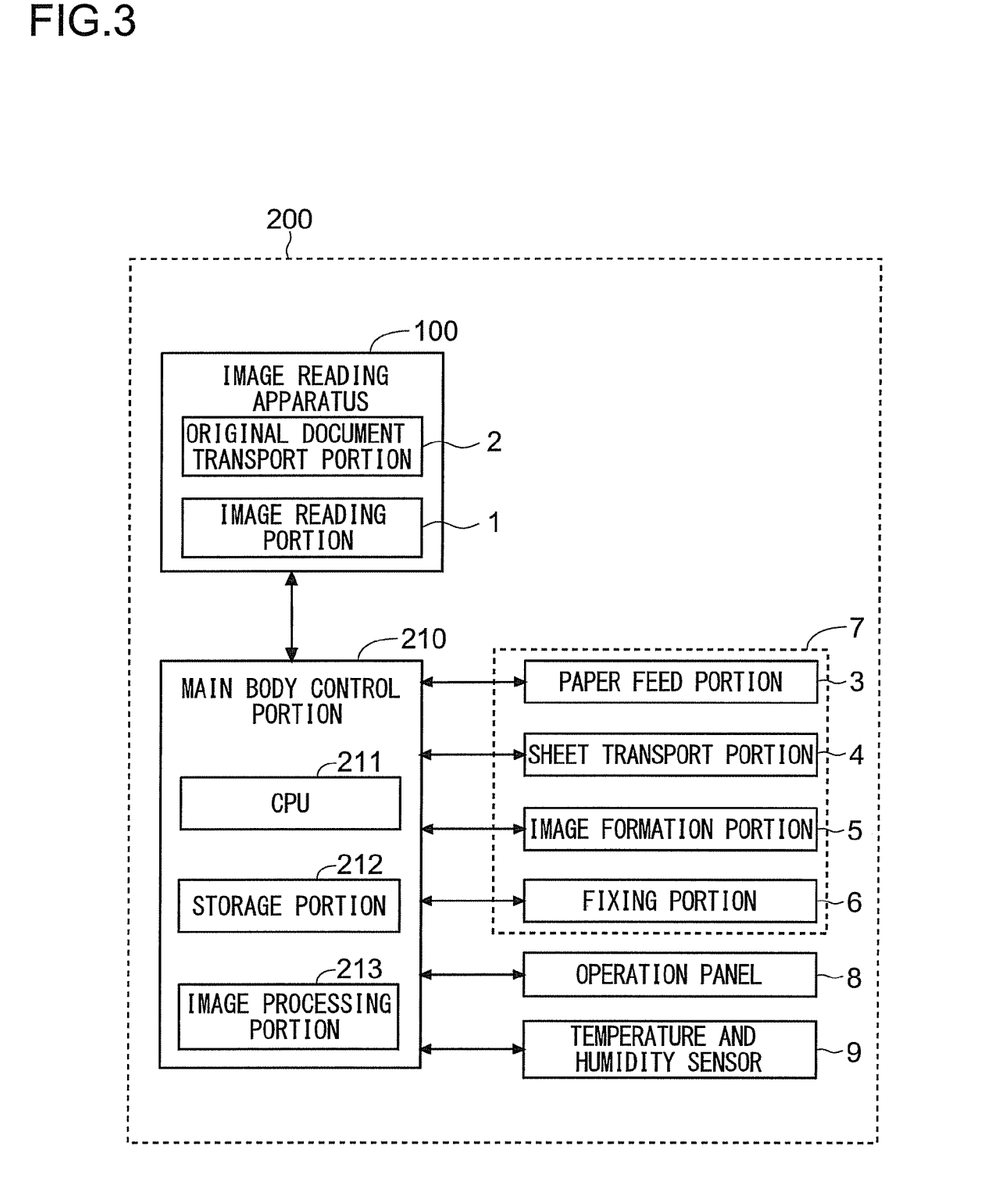
FIG. 3 is a block diagram illustrating the hardware configuration of the image forming apparatus including the image reading apparatus shown in FIG. 1.

As shown in FIG. 3, the image forming apparatus 200 includes a main body control portion 210. The main body control portion 210 includes a CPU 211, a storage portion 212 and an image processing portion 213. The storage portion 212 is formed with a ROM, a RAM and the like, and for example, various types of programs and data are stored in the ROM and are spread over the RAM. The image processing portion 213 is formed with an ASIC specifically for image processing, a memory and the like, and performs various types of image processing such as enlargement/reduction, density conversion and data format conversion on the image data.

The main body control portion 210 is connected to the engine portion 7 (the paper feed portion 3, the sheet transport portion 4, the image formation portion 5 and the fixing portion 6) and the operation panel 8. Then, the main body control portion 210 performs control, computation and the like on individual portions based on the various types of programs and data stored in the storage portion 212. Furthermore, the main body control portion 210 is connected to the image reading apparatus 100 (the image reading portion 1 and the original document transport portion 2), and also performs control on the image reading portion 1 and the original document transport portion 2.

Furthermore, the main body control portion 210 is connected to a temperature and humidity sensor 9 for measuring temperature and humidity around the image forming apparatus 200, and detects the temperature and the humidity around the image forming apparatus 200. Then, the main body control portion 210 determines printing setting values (for example, a voltage value fed to the individual portions of the engine portion 7) according to the temperature and the humidity around the image forming apparatus 200. As an example, the resistance values of the sheet P, the transfer roller 55 and the like are changed by variations in the temperature and the humidity around the image forming apparatus 200. Hence, the main body control portion 210 changes settings such as the transfer voltage applied to the transfer roller 55, according to the temperature and the humidity around the image forming apparatus 200.

(Hardware Configuration of the Image Reading Apparatus)

Figure 4:
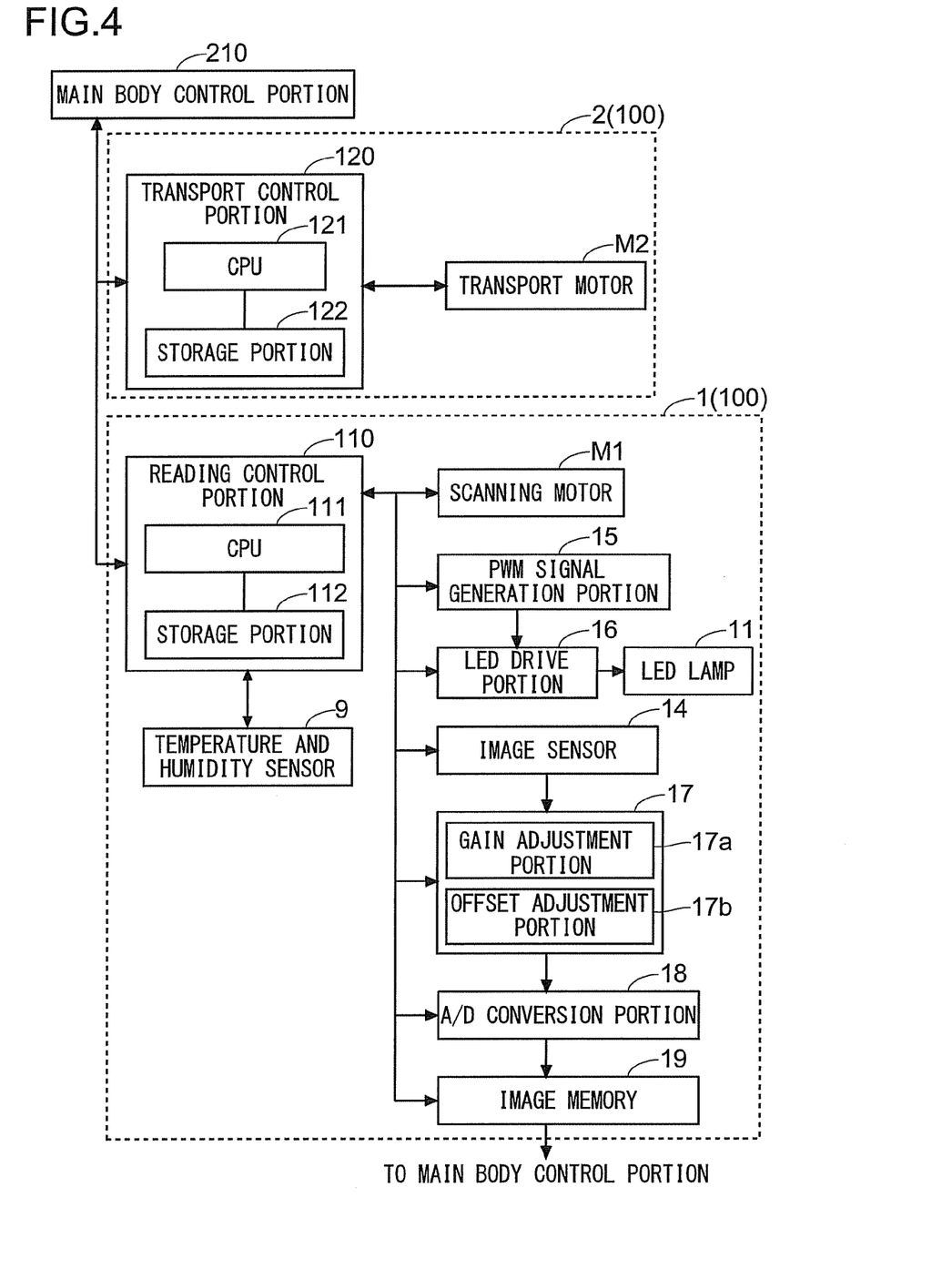
FIG. 4 is a block diagram illustrating the hardware configuration of the image reading apparatus shown in FIG. 1.

As shown in FIG. 4, the image reading apparatus 100 includes a reading control portion 110 that controls the reading operation of the image reading portion 1 and a transport control portion 120 that controls the transport operation of the original document transport portion 2.

The transport control portion 120 includes a CPU 121 and a storage portion 122 (a ROM and a RAM), and is operated by receiving an instruction from the main body control portion 210. Specifically, the transport control portion 120 is connected to the transport motor M2 for rotating the original document feed roller 24, the original document transport roller pair 25 and the original document ejection roller pair 26. Then, the transport control portion 120 controls the driving of the transport motor M2, and appropriately rotates the original document feed roller 24, the original document transport roller pair 25 and the original document ejection roller pair 26.

The reading control portion 110 includes a CPU 111 and a storage portion 112 (a ROM and a RAM), and operates by receiving an instruction from the main body control portion 210. Specifically, the reading control portion 110 is connected to the scanning motor M1 for moving the movement frame 10 (the LED lamp 11 and the mirror 12) in the sub scanning direction. Then, the reading control portion 110 controls the driving of the scanning motor M1, and moves the movement frame 10 (the LED lamp 11 and the mirror 12) to an appropriate position.

The reading control portion 110 is also connected to the image sensor 14, a PWM signal generation portion 15, an LED drive portion 16, an analog processing portion 17, an A/D conversion portion 18 and an image memory 19, and also performs control on theses individual portions.

The PWM signal generation portion 15 receives an instruction from the reading control portion 110, generates a PWM signal for adjusting the amount of light (light emission level) of the LED lamp 11 in a PWM dimming method and outputs it to the LED drive portion 16. In other words, the reading control portion 110 connected to the PWM signal generation portion 15 corresponds to a "light amount adjustment portion" of the present disclosure. The PWM dimming method refers to a method in which the LED lamp 11 is periodically turned on and off, and dimming is performed by changing a time ratio between a turning-on period and a turning-off period. The LED drive portion 16 turns on (turns on and off) the LED lamp 11 based on the PWM signal.

The analog processing portion 17 is a circuit that performs amplification processing and the like on the analog output of the image sensor 14. The analog processing portion 17 includes a gain adjustment portion 17a that performs a gain adjustment for adjusting the white reference and an offset adjustment portion 17b that performs an offset adjustment for adjusting a black reference. The A/D conversion portion 18 quantizes, for example, the analog output of the image sensor 14 processed by the analog processing portion 17 into 0 to 255 gray scales, converts it into digital image data (density data) and outputs it. The image memory 19 accumulates the image data output from the A/D conversion portion 18, and transfers it to the main body control portion 210.

Then, the main body control portion 210 receiving the image data performs various types of image processing on the image data to generate image data for exposure (the image data for turning on and off the light emission elements of the exposure device 53).

The reading control portion 110 is connected to the temperature and humidity sensor 9. Alternatively, the reading control portion 110 receives the output of the temperature and humidity sensor 9 through the main body control portion 210. Then, the reading control portion 110 detects the temperature around the image reading apparatus 100 based on the output of the temperature and humidity sensor 9. In other words, the temperature and humidity sensor 9 corresponds to a "temperature sensor" of the present disclosure.

(Initial Adjustment on the Image Reading Apparatus)

Before factory shipment, the image reading apparatus 100 performs the initial adjustment including a plurality of adjustments such as the light amount adjustment on the LED lamp 11, the gain adjustment for adjusting the white reference and the offset adjustment for adjusting the black reference.

In the light amount adjustment on the LED lamp 11, the reading control portion 110 moves the LED lamp 11 below the white reference plate 27. Then, the reading control portion 110 provides an instruction to the LED drive portion 16 to turn on (turn on and off) the LED lamp 11. Thus, the light reflected off the white reference plate 27 enters the image sensor 14. In other words, the reading control portion 110 makes the image sensor 14 read the white reference plate 27.

Here, the analog output of the image sensor 14 is processed by the analog processing portion 17, and is then converted by the A/D conversion portion 18 from analog to digital. At this time, the digital value on which the A/D conversion has been performed is increased as the analog output of the image sensor 14 is increased. In other words, as the image of the target to be read is brightened, the digital value after the A/D conversion is increased whereas as the image of the target to be read is dimmed, the digital value after the A/D conversion is decreased.

However, when the analog output of the image sensor 14 processed by the analog processing portion 17 exceeds the upper limit value of an input voltage range (convertible range) of the A/D conversion portion 18, even if the analog output of the image sensor 14 is varied such that the analog output is increased, the digital value after the A/D conversion is not varied, and all the analog output is converted into the maximum digital value. Hence, it is necessary to prevent the analog output of the image sensor 14 reading the white reference plate 27 (the maximum value of the analog output of the image sensor 14 processed by the analog processing portion 17) from exceeding the upper limit value of the input voltage range of the A/D conversion portion 18.

The gain setting value of the analog processing portion 17 (the gain adjustment portion 17a) is 1 or more. Thus, when the analog output of the image sensor 14 reading the white reference plate 27 exceeds the upper limit value of the input voltage range of the A/D conversion portion 18, with the adjustment of the gain setting value, it is impossible to achieve a satisfactory result. Hence, the reading control portion 110 reduces (performs the light amount adjustment) the amount of light of the LED lamp 11, and thereby prevents the analog output of the image sensor 14 reading the white reference plate 27 from exceeding the upper limit value of the input voltage range of the A/D conversion portion 18.

When the amount of light of the LED lamp 11 is reduced, the reading control portion 110 provides an instruction to the PWM signal generation portion 15 to stepwise reduce the duty ratio of the PWM signal output to the LED drive portion 16 by a predetermined cut width. Thus, the amount of light of the LED lamp 11 is stepwise reduced. The reading control portion 110 reduces the amount of light of the LED lamp 11 until the analog output of the image sensor 14 reading the white reference plate 27 (the maximum value of the analog output of the image sensor 14 processed by the analog processing portion 17) falls within the input voltage range of the A/D conversion portion 18. Thereafter, the reading control portion 110 completes the light amount adjustment when the analog output of the image sensor 14 reading the white reference plate 27 falls within the input voltage range of the A/D conversion portion 18 (when the maximum value of the analog output after the analog processing by the image sensor 14 approaches the upper limit value of the input voltage range of the A/D conversion portion 18). Then, the reading control portion 110 stores, in the storage portion 112, the duty ratio of the PWM signal at that time, as a light amount setting value.

When the analog output of the image sensor 14 reading the white reference plate 27 (the maximum value of the analog output of the image sensor 14 processed by the analog processing portion 17) becomes significantly less than the upper limit value of the input voltage range of the A/D conversion portion 18, a readable color range (readable density range) is narrowed. Hence, it is necessary to make the analog output of the image sensor 14 reading the white reference plate 27 approach the upper limit value of the input voltage range of the A/D conversion portion 18. Thus, in this case, the reading control portion 110 increases the amount of light of the LED lamp 11 (performs the light amount adjustment), and thereby makes the analog output of the image sensor 14 reading the white reference plate 27 approach the upper limit value of the input voltage range of the A/D conversion portion 18.

In the gain adjustment for adjusting the white reference, the reading control portion 110 makes the image sensor 14 read the white reference plate 27. Then, the reading control portion 110 sets the gain setting value of the gain adjustment portion 17*a* such that the analog output of the image sensor 14 reading the white reference plate 27 (the maximum value of the analog output processed by the analog processing portion 17) approach the upper limit value of the input voltage range of the A/D conversion portion 18.

In the offset adjustment for adjusting the black reference, the reading control portion 110 turns off the LED lamp 11. Then, the reading control portion 110 sets the offset setting value of the offset adjustment portion 17*b* such that the analog output of the image sensor 14 when the LED lamp 11 is turned off (the analog output processed by the analog processing portion 17) approach the lower limit value of the input voltage range of the A/D conversion portion 18.

As described above, before the factory shipment, the initial adjustment including a plurality of adjustments such as the light amount adjustment, the gain adjustment and the offset adjustment is performed. However, the characteristics of the LED lamp 11 and the image sensor 14 vary with time. The white reference plate 27 may be stained. Hence, the initial adjustment is performed not only before the factory shipment but also at the time of starting up of the apparatus after the factory shipment. However, when the initial adjustment is performed at the time of starting up of the apparatus, it takes much time until it is possible to perform the execution of a job since power is input to the apparatus, with the result that it is inconvenient for the user.

Hence, in the present embodiment, the adjustments (such as the gain adjustment and the offset adjustment) other than the light amount adjustment are performed every time at the time of starting up of the apparatus after the factory shipment. On the other hand, the light amount adjustment may be performed at the time of starting up of the apparatus after the factory shipment or may not be performed at the time of starting up of the apparatus after the factory shipment. In the following description, the initial adjustment including all the adjustments such as the light amount adjustment, the gain adjustment and the offset adjustment may be referred to as a normal adjustment, and the initial adjustment excluding the light amount adjustment may be referred to as a simple adjustment.

Which of the normal adjustment and the simple adjustment is performed as the initial adjustment at the time of starting up of the apparatus after the factory shipment (whether or not the light amount adjustment is performed) is determined by the reading control portion 110 based on the temperature around the apparatus at the time of starting up of the apparatus. Specifically, in the LED lamp 11, as the temperature around the apparatus is increased, the light emission efficiency is decreased whereas as the temperature around the apparatus is decreased, the light emission efficiency is increased. In other words, when the temperature around the apparatus is decreased, the amount of light of the LED lamp 11 is increased whereas when the temperature around the apparatus is increased, the amount of light of the LED lamp 11 is decreased. Hence, when the current temperature around the apparatus varies significantly with respect to the temperature around the apparatus at the time of the previous normal adjustment (at the time of the light amount adjustment), it is likely that the analog output of the image sensor 14 reading the white reference plate 27 (the maximum value of the analog output of the image sensor 14 processed by the analog processing portion 17) significantly falls outside the upper limit value of the input voltage range of the A/D conversion portion 18. On the other hand, when the current temperature around the apparatus varies little with respect to the temperature around the apparatus at the time of the previous normal adjustment (at the time of the light amount adjustment), the current amount of light of the LED lamp 11 varies little with respect to the amount of light of the LED lamp 11 at the time of the previous normal adjustment. Hence, in this case, it is not necessary to perform the light amount adjustment.

Hence, at the time of the normal adjustment (at the time of the light amount adjustment) in the factory, the reading control portion 110 detects the temperature around the apparatus, and stores, in the storage portion 112, temperature data indicating the temperature around the apparatus at the time of the normal adjustment in the factory. For example, at the time of the normal adjustment in the factory, the reading control portion 110 detects the temperature around the apparatus based on the output of the temperature and humidity sensor 9 (the sensor originally fitted to the main body of the image forming apparatus 200) used for the adjustment of the transfer voltage or like. Alternatively, although not shown in the figure, a temperature sensor for the light amount adjustment is separately fitted to the image reading apparatus 100, with the result that the temperature around the apparatus may be detected based on the output of the temperature sensor for the light amount adjustment.

Then, at the time of the first starting up of the apparatus after the factory shipment, the reading control portion 110 detects the temperature around the apparatus at the time of starting up of the apparatus. The reading control portion 110 compares the temperature already stored in the storage portion 112 (the temperature around the apparatus at the time of the normal adjustment in the factory) with the current temperature around the apparatus (the temperature around the apparatus at the time of the first starting up of the apparatus after the factory shipment). As a result of the comparison, when the absolute value of a temperature difference between the temperature already stored in the storage portion 112 and the current temperature around the apparatus is equal to or more than a predetermined threshold value, the reading control portion 110 performs the normal adjustment including the light amount adjustment. On the other hand, when the absolute value of the temperature difference between the temperature already stored in the storage portion 112 and the current temperature around the apparatus is less than the threshold value, the reading control portion 110 performs the simple adjustment excluding the light amount adjustment. In other words, the light amount adjustment is not performed.

For example, the threshold value that is a criterion for which of the normal adjustment and the simple adjustment is performed at the time of starting up of the apparatus is set at 10° C. Alternatively, the absolute value of a temperature difference between a temperature around the apparatus when the light emission efficiency of the LED lamp 11 is varied by about a few percent to few tens of percent while the temperature around the apparatus is being varied and the light emission efficiency of the LED lamp 11 is being measured and a temperature around the apparatus before the variation in the light emission efficiency of the LED lamp 11 may be set at the threshold value.

When the reading control portion 110 performs the normal adjustment including the light amount adjustment at the time of the first starting up of the apparatus after the factory shipment, the reading control portion 110 updates the temperature data already stored in the storage portion 112 to the temperature data indicating the current temperature around the apparatus. Hence, when the normal adjustment including the light amount adjustment is performed at the time of the first starting up of the apparatus after the factory shipment, the temperature data indicating the temperature around the apparatus at the time of the normal adjustment in the factory is updated to the temperature data indicating the temperature around the apparatus at the time of the first starting up of the apparatus (at the time of the normal adjustment) after the factory shipment. On the other hand, when the simple adjustment excluding the light amount adjustment is performed at the time of the first starting up of the apparatus after the factory shipment, the temperature data already stored in the storage portion 112 is not updated. In other words, in this case, the temperature data indicating the temperature around the apparatus at the time of the normal adjustment in the factory is retained in the storage portion 112 without being processed.

Thereafter, the reading control portion 110 detects the temperature around the apparatus at the time of starting up of the apparatus each time the apparatus is started up, and determines, based on the temperature around the apparatus at the time of starting up of the apparatus, which of the normal adjustment and the simple adjustment is performed (whether or not the light amount adjustment is performed). Here, when the normal adjustment has already been performed after the factory shipment, the temperature around the apparatus at the time of the normal adjustment after the factory shipment is compared with the current temperature around the apparatus. On the other hand, when the normal adjustment has not been performed after the factory shipment, the temperature around the apparatus at the time of the normal adjustment in the factory is compared with the current temperature around the apparatus. In each case, the reading control portion 110 performs the normal adjustment or the simple adjustment each time the apparatus is started up. Then, the reading control portion 110 updates the temperature data already stored in the storage portion 112 to the temperature data indicating the current temperature around the apparatus each time the normal adjustment (the light amount adjustment) is performed.

Incidentally, when at the time of starting up of the apparatus after the factory shipment, the current temperature around the apparatus is higher than the temperature around the apparatus at the time of the previous normal adjustment (at the time of the light amount adjustment), the light emission efficiency of the LED lamp 11 is reduced, and thus the current amount of light of the LED lamp 11 is reduced as compared with the amount of light of the LED lamp 11 at the time of the previous normal adjustment. Hence, since the analog output of the image sensor 14 reading the white reference plate 27 (the maximum value of the analog output processed by the analog processing portion 17) does not exceed the upper limit value of the input voltage range of the A/D conversion portion 18, it is possible to obtain a satisfactory result only by adjusting the gain setting value. Hence, only when the current temperature around the apparatus is lower than the temperature already stored in the storage portion 112 (the temperature around the apparatus at the time of the previous normal adjustment) by the threshold value or more, the normal adjustment including the light amount adjustment may be performed. In this way, since when the temperature already stored in the storage portion 112 (the temperature around the apparatus at the time of the previous normal adjustment) is not lower than the current temperature around the apparatus by the threshold value or more, the light amount adjustment is not performed (the simple adjustment is performed), the time necessary for the initial adjustment is reduced.

(Flow of the Initial Adjustment)

With reference to a flowchart shown in FIG. 5, the flow of the initial adjustment (the normal adjustment including all the adjustments such as the light amount adjustment, the gain adjustment and the offset adjustment) before the factory shipment will first be described.

Figure 5:
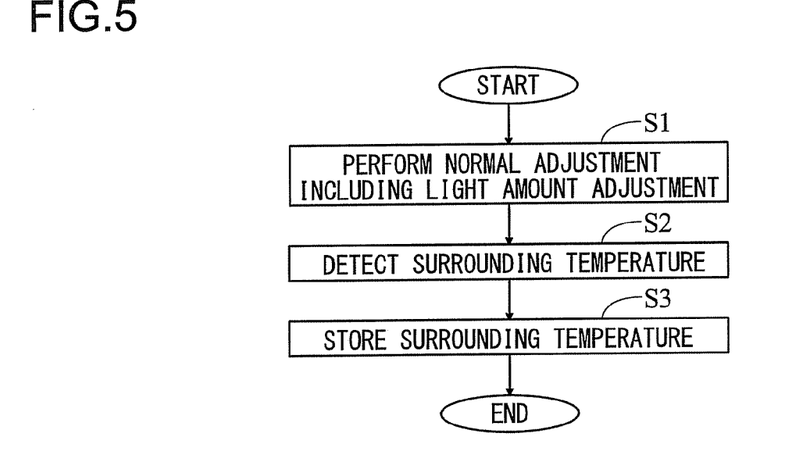
FIG. 5 is a flowchart illustrating the flow of an initial adjustment performed when the image reading apparatus shown in FIG. 1 is shipped from a factory.

The start in the flowchart of FIG. 5 is a time when power is input to the image reading apparatus 100 so that the normal adjustment is performed in the factory. At the time of the start in the flowchart of FIG. 5, the normal adjustment (the light amount adjustment) has not been performed yet. Hence, in the storage portion 112, the temperature data indicating the temperature around the apparatus at the time of the normal adjustment (at the time of the light amount adjustment) is not stored.

In step S1, the reading control portion 110 performs the normal adjustment including the light amount adjustment. In step S2, the reading control portion 110 detects the current temperature around the apparatus based on the output of the temperature and humidity sensor 9. Then, in step S3, the reading control portion 110 stores, in the storage portion 112, the temperature data indicating the temperature around the apparatus at the time of the normal adjustment (at the time of the light amount adjustment).

With reference to a flowchart shown in FIG. 6, the flow at the time of starting up of the apparatus after the factory shipment will now be described.

Figure 6:
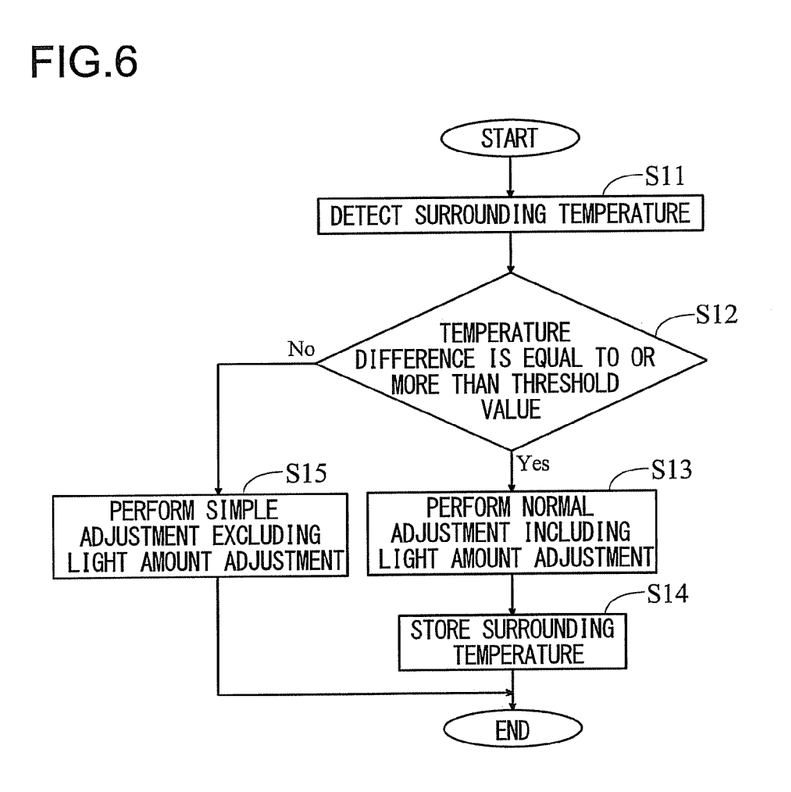
FIG. 6 is a flowchart illustrating the flow of an initial adjustment performed when the image reading apparatus shown in FIG. 1 is started up after the factory shipment.

The start in the flowchart of FIG. 6 is a time when power is input to the image reading apparatus 100 after the factory shipment. At the time of the start in the flowchart of FIG. 6, the normal adjustment (the light amount adjustment) has already been performed. Hence, in the storage portion 112, the temperature data indicating the temperature around the apparatus at the time of the normal adjustment (at the time of the light amount adjustment) is stored.

In step S11, the reading control portion 110 detects the current temperature around the apparatus based on the output of the temperature and humidity sensor 9. Then, in step S12, the reading control portion 110 determines whether or not the absolute value of a temperature difference between the temperature already stored in the storage portion 112 (the temperature around the apparatus at the time of the previous normal adjustment) and the current temperature around the apparatus is equal to or more than the threshold value (for example, 10° C.). As a result of the determination, when the absolute value of the temperature difference between the temperature already stored in the storage portion 112 and the current temperature around the apparatus is equal to or more than the threshold value, the process proceeds to step S13.

When the process proceeds to step S13, the reading control portion 110 performs the normal adjustment including the light amount adjustment. Then, in step S14, the reading control portion 110 stores, in the storage portion 112, the temperature data indicating the temperature around the apparatus at the time of the normal adjustment (at the time of the light amount adjustment). In other words, the storage portion 112 updates the temperature data to the temperature data indicating the current temperature.

On the other hand, in step S12, the absolute value of the temperature difference between the temperature already stored in the storage portion 112 and the current temperature around the apparatus is less than the threshold value, the process proceeds to step S15. When the process proceeds to step S15, the reading control portion 110 performs the simple adjustment excluding the light amount adjustment. When the process proceeds to step S15, the temperature data already stored in the storage portion 112 is not updated.

The image reading apparatus 100 (the image forming apparatus 200) of the present embodiment includes as described above: the LED lamp 11 (corresponding to the "light source" of the present disclosure) which applies light to a target to be read; the image sensor 14 which receives light reflected off the target to be read to read the target to be read; the analog processing portion 17 which performs analog processing on the analog output of the image sensor 14; the A/D conversion portion 18 which converts the analog output of the image sensor 14 processed by the analog processing portion 17 into digital image data; the reading control portion 110 (corresponding to the "light amount adjustment portion" of the present disclosure) which performs light amount adjustment on the LED lamp 11 such that a maximum value of the analog output of the image sensor 14 processed by the analog processing portion 17 does not exceed an upper limit value of an input voltage range of the A/D conversion portion 18 but approaches the upper limit value; the temperature and humidity sensor 9 (corresponding to the "temperature sensor" of the present disclosure). which measures a temperature around the image reading apparatus 200; and the storage portion 112 which stores temperature data indicating the temperature around the image reading apparatus 100 at a time of the light amount adjustment. When an absolute value of a temperature difference between a temperature stored in the storage portion 112 and a current temperature is less than a predetermined threshold value, the reading control portion 110 does not perform the light amount adjustment whereas when the absolute value of the temperature difference between the temperature stored in the storage portion 112 and the current temperature is equal to or more than the threshold value, the reading control portion 110 performs the light amount adjustment.

Here, the amount of light of the LED lamp 11 depends on the temperature. Specifically, as the temperature is decreased, the light emission efficiency of the LED lamp 11 is increased, with the result that the amount of light of the LED lamp 11 is increased whereas as the temperature is increased, the light emission efficiency of the LED lamp 11 is decreased, with the result that the amount of light of the LED lamp 11 is reduced. Thus, when the current temperature varies little with respect to the temperature at the time of the previous light amount adjustment, even if the LED lamp 11 is driven without any change in the light amount setting value set at the time of the previous light amount adjustment, the maximum value of the analog output of the image sensor 14 is retained to be a value (value close to the upper limit value) that does not exceed the upper limit value of the input voltage range of the A/D conversion portion 18, with the result that it is not necessary to perform the light amount adjustment. However, when the current temperature significantly varies with respect to the temperature at the time of the previous light amount adjustment, if the LED lamp 11 is driven without any change in the light amount setting value set at the time of the previous light amount adjustment, the maximum value of the analog output of the image sensor 14 is likely to exceed the upper limit of the input voltage range of the A/D conversion portion 18, with the result that it is preferable to perform the light amount adjustment.

Hence, in the configuration of the present embodiment, when the absolute value of a temperature difference between the temperature stored in the storage portion 112 (the temperature at the time of the previous light amount adjustment) and the current temperature is less than the threshold value, it is regarded that the current temperature varies little with respect to the temperature at the time of the previous light amount adjustment, with the result that the light amount adjustment is not performed. In this way, it is possible to reduce the time necessary for the initial adjustment on the image forming apparatus 200 according to the omission of the light amount adjustment. Hence, even if the image forming apparatus 200 performs the initial adjustment, since the waiting time until it is possible to perform the execution of a job is reduced, user convenience is enhanced. In this case, since the current temperature varies little with respect to the temperature at the time of the previous light amount adjustment (the amount of light of the LED lamp 11 varies little), even if the light amount adjustment is not performed, the maximum value of the analog output of the image sensor 14 is retained to be a value (value close to the upper limit value) that does not exceed the upper limit value of the input voltage range of the A/D conversion portion 18. In this way, the degradation of the image quality caused by the saturation of the output of the A/D conversion portion 18 is prevented.

In the configuration of the present embodiment, when the absolute value of the temperature difference between the temperature stored in the storage portion 112 (the temperature at the time of the previous light amount adjustment) and the current temperature is equal to or more than the threshold value, it is regarded that the current temperature significantly varies with respect to the temperature at the time of the previous light amount adjustment, with the result that the light amount adjustment is performed. In other words, when it is likely that the maximum value of the analog output of the image sensor 14 exceeds the upper limit value of the input voltage range of the A/D conversion portion 18, the light amount adjustment is performed. In this way, the output of the A/D conversion portion 18 is not saturated, and thus it is possible to reduce the degradation of the image quality.

In the present embodiment, as described above, the analog processing portion 17 includes the gain adjustment portion 17a (the adjustment portion) and the offset adjustment portion 17b (the adjustment portion), and, as the initial adjustment on the image reading apparatus 100, the gain adjustment (the adjustment of the gain setting value by the gain adjustment portion 17a) for adjusting the white reference and the offset adjustment (the adjustment of the offset setting value by the offset adjustment portion 17b) for adjusting the black reference are performed. Then, the gain adjustment and the offset adjustment are performed regardless of the temperature difference between the temperature stored in the storage portion 112 (the temperature at the time of the previous light amount adjustment) and the current temperature. In other words, when the absolute value of the temperature difference between the temperature stored in the storage portion 112 and the current temperature is less than the threshold value, the reading control portion 110 does not perform the light amount adjustment, but performs the gain adjustment and the offset adjustment. On the other hand, when the absolute value of the temperature difference between the temperature stored in the storage portion 112 and the current temperature is equal to or more than the threshold value, the reading control portion 110 performs not only the light amount adjustment but also the gain adjustment and the offset adjustment. Here, even if the current temperature varies little with respect to the temperature at the time of the previous light amount adjustment, the characteristics of the LED lamp 11 and the image sensor 14, the degree of the stain of the white reference plate 27 and the like vary with time. Hence, in this configuration, even if the light amount adjustment is not performed, the gain adjustment, the offset adjustment and the like are performed.

In the present embodiment, as described above, each time the light amount adjustment is performed, the temperature data stored in the storage portion 112 is updated to the temperature data indicating the current temperature. In this configuration, when a determination is made as to whether or not the light amount adjustment is performed, it is possible to easily compare the current temperature with the temperature at the time of the previous light amount adjustment.

In the present embodiment, as described above, when at the time of starting up of the apparatus, the absolute value of the temperature difference between the temperature stored in the storage portion 112 and the temperature (the current temperature) at the time of starting up of the apparatus is less than the threshold value, the reading control portion 110 does not perform the light amount adjustment whereas when the absolute value of the temperature difference between the temperature stored in the storage portion 112 and the temperature (the current temperature) at the time of starting up of the apparatus is equal to or more than the threshold value, the reading control portion 110 performs the light amount adjustment. In this configuration, it is possible to reduce the waiting time until it is possible to perform the execution of a job since power is input to the apparatus.

It should be considered that the embodiment disclosed herein is illustrative in all respects, not restrictive. The scope of the present disclosure is indicted not by the description of the embodiment discussed above but by the scope of claims, and furthermore, meanings equivalent to the scope of claims and all modifications within the scope are included.

For example, although in the embodiment described above, the initial adjustment (the normal adjustment or the simple adjustment) is performed at the time of starting up of the apparatus, the present disclosure is not limited to this configuration. Specifically, at a predetermined time (for example, before the start of a job or after the completion of a job) when a job (job involving reading by the image reading apparatus) during the starting up of the apparatus is not performed, the temperature already stored in the storage portion 112 (the temperature around the apparatus at the time of the previous normal adjustment) is compared with the current temperature around the apparatus, with the result that the normal adjustment or the simple adjustment may be performed based on the result of the comparison.

What is claimed is:

1. An image reading apparatus comprising:
a light source which applies light to a target to be read;
an image sensor which receives light reflected off the target to be read to read the target to be read;
an analog processing portion which performs analog processing on an analog output of the image sensor;
an A/D conversion portion which converts the analog output of the image sensor processed by the analog processing portion into digital image data;
a light amount adjustment portion which performs light amount adjustment on the light source such that a maximum value of the analog output of the image sensor processed by the analog processing portion does not exceed an upper limit value of an input voltage range of the A/D conversion portion but approaches the upper limit value;
a temperature sensor which measures a temperature around the image reading apparatus; and
a storage portion which stores temperature data indicating the temperature around the image reading apparatus at a time of the light amount adjustment,
wherein when an absolute value of a temperature difference between the temperature stored in the storage portion and a current temperature is less than a predetermined threshold value, the light amount adjustment portion does not perform the light amount adjustment whereas when the absolute value of the temperature difference between the temperature stored in the storage portion and the current temperature is equal to or more than the threshold value, the light amount adjustment portion performs the light amount adjustment.

2. The image reading apparatus of claim 1,
wherein the analog processing portion includes an adjustment portion which performs a gain adjustment for adjusting a white reference and an offset adjustment for adjusting a black reference, and
when the absolute value of the temperature difference between the temperature stored in the storage portion and the current temperature is less than the threshold value, the light amount adjustment portion does not perform the light amount adjustment, and the adjustment portion performs the gain adjustment and the offset adjustment whereas when the absolute value of the temperature difference between the temperature stored in the storage portion and the current temperature is equal to or more than the threshold value, the light amount adjustment portion performs the light amount adjustment, and the adjustment portion performs the gain adjustment and the offset adjustment.

3. The image reading apparatus of claim 1,
wherein the storage portion updates the temperature data to temperature data indicating the current temperature each time the light amount adjustment is performed.

4. The image reading apparatus of claim 1,
wherein when at a time of starting up of the image reading apparatus, an absolute value of a temperature difference between the temperature stored in the storage portion and a temperature at the time of starting up of the image reading apparatus is less than the threshold value, the light amount adjustment portion does not perform the light amount adjustment whereas when the absolute value of the temperature difference between the temperature stored in the storage portion and the temperature at the time of starting up of the image reading apparatus is equal to or more than the threshold value, the light amount adjustment portion performs the light amount adjustment.

5. The image reading apparatus of claim 1,
wherein at a predetermined time during the starting up of the image reading apparatus, the light amount adjustment portion compares the temperature stored in the storage portion with a temperature at the predetermined time, and when an absolute value of a temperature difference between the temperature stored in the storage portion and the temperature at the predetermined time is less than the threshold value, the light amount adjustment portion does not perform the light amount adjustment at the predetermined time whereas when the absolute value of the temperature difference between the temperature stored in the storage portion and the temperature at the predetermined time is equal to or more than the threshold value, the light amount adjustment portion performs the light amount adjustment at the predetermined time.

6. The image reading apparatus of claim 5,
wherein the predetermined time is at least one of a time before start of a job involving reading by the image reading apparatus and a time after completion of the job.

7. The image reading apparatus of claim 1,
wherein when the current temperature is lower than the temperature stored in the storage portion by the threshold value or more, the light amount adjustment portion performs the light amount adjustment whereas the current temperature is not lower than the temperature stored in the storage portion by the threshold value or more, the light amount adjustment portion does not perform the light amount adjustment.

8. An image forming apparatus comprising the image reading apparatus of claim 1.

* * * * *